United States Patent
Suponnikov et al.

(10) Patent No.: US 9,864,070 B2
(45) Date of Patent: Jan. 9, 2018

(54) SCINTILLATION DETECTOR

(71) Applicant: "STC-MT" LLC, Moscow (RU)

(72) Inventors: Dmitriy Aleksandrovich Suponnikov, Moscow (RU); Andrey Nikolaevich Putilin, Moscow (RU); Anatoly Rudolfovich Dabagov, Moscow (RU)

(73) Assignee: "STC-MT" LLC, Moscow (RU)

( * ) Notice: Subject to any disclaimer, the term of this patent is extended or adjusted under 35 U.S.C. 154(b) by 245 days.

(21) Appl. No.: 14/765,639

(22) PCT Filed: Feb. 3, 2014

(86) PCT No.: PCT/RU2014/000076
§ 371 (c)(1),
(2) Date: Aug. 4, 2015

(87) PCT Pub. No.: WO2014/120050
PCT Pub. Date: Aug. 7, 2014

(65) Prior Publication Data
US 2015/0378033 A1    Dec. 31, 2015

(30) Foreign Application Priority Data
Feb. 4, 2013   (RU) ................................ 2013104513

(51) Int. Cl.
*G01T 1/20*   (2006.01)
(52) U.S. Cl.
CPC .............. *G01T 1/2002* (2013.01); *G01T 1/20* (2013.01)
(58) Field of Classification Search
CPC ................................ G01T 1/20; G01T 1/2002

USPC ......................................................... 250/368
See application file for complete search history.

(56) References Cited

FOREIGN PATENT DOCUMENTS

WO   2009024895   2/2009

OTHER PUBLICATIONS

Valuev N P et al., "Methods and Apparatus for Measurement of Positron Lifetime (Survey)", Instruments and Experimental Techniques, Consultants Bureau. New York, US, vol. 29, No. 2, Part 1, Mar. 1, 1986, pp. 263-287.
Bhatnagar K G et al., "Large Plastic Scintillators of Parabolic Shape", XP002726699, Database accession No. 1966A17052 abstract, Database INSPEC [Online] The Institution of Electrical Engineers, Stevenage, GB, Dec. 1965.
(Continued)

*Primary Examiner* — David Porta
*Assistant Examiner* — Meenakshi Sahu
(74) *Attorney, Agent, or Firm* — Boyle Fredrickson S.C.

(57) ABSTRACT

The invention relates to X-ray imaging devices, particularly to devices for X-ray mammography and tomosynthesis. The scintillation detector comprises at least one photosensor with an array of cells each of thereof has a photosensitive area, and a scintillator arranged in the form of a structured aggregate made of elements isolated from each other and placed on the surface of the photosensor. The new construction of the proposed scintillation detector is the completely eliminated need for precise alignment of the structured scintillator based on the elements with a matrix of cells of a photosensor. Precise arrangement of the scintillation elements and the matrix of cells of a photosensor is performed directly during the formation of the scintillation elements. The technical result achieved by using the invention is the increase of image contrast.

14 Claims, 2 Drawing Sheets

(56) References Cited

OTHER PUBLICATIONS

Hamilton D J et al., "An Electromagnetic Calorimeter for the JLab Real Compton Scattering Experiment", Nuclear Instruments & Methods in Physics Research. Section A: Accelerators, Spectrometers, Detectors, and Associated Equipment, Elsevier BV, North-Holland, NL, vol. 643 No. 1, Jan. 17, 2011, pp. 17-28, XP028216804.

Gary et al. "Radiography and tomography system using refractive lenses", Penetrating Radiation Systems and Applications VIII, SPIE vol. 6707 (2007), pp. 67070R-1-67070R-6.

"Efficient Particle-To-Optical Fiber Array Photon Converter", IBM Technical Disclosure Bulletin, Thornwood, US, vol. 33, No. 8, Jan. 1, 1991, pp. 348-349, XP000109212.

Ikhlef et al. "Crosstalk Modeling of a CT Detector", Medical Imaging 2004: Physics of Medical Imaging, SPIE vol. 5368, pp. 906-913.

SCINTILLATION DETECTOR

TECHNICAL FIELD OF THE INVENTION

The invention relates to the devices intended for obtaining X-ray or gamma radiation images, in particular to the devices for X-ray mammography, tomosynthesis and Non Destructive Testing systems.

PRIOR ART

So-called "Flat panel" visible image detectors (photosensors) are conventionally used for constructing the digital x-ray detectors including mammographic detectors, which detect the visible light field converted from the X-ray shadow image of the object. Such flat panel detectors are full-scale 2D matrix image sensors with 1:1 scale transformation.

The photosensor itself has a high sensitivity at the wavelength bandwidth of visible light (400-700 nm) and is usually not sensitive to X-ray radiation. Thus the X-ray image is to be converted into visible light, and scintillating screens (scintillators) are used for that. Scintillator screens are based on the phosphor layers of specified efficiency and scattering characteristics. This screen is physically attached to the 2D photosensor matrix, forming a stack for spatial transformation: "X-ray image→Electrical signal". Then such signal is digitized and transmitted for processing and rendering. Similar scheme is used in detectors for gamma radiation.

From the prior art the scintillation screen based on the well-like etched silicon structure filled by gadolinium oxysulfide phosphor is known. The well-like structure obtained by anisotropic plasma etching of silicon wafer (Pixel-structured scintillators for digital x-ray imaging, S M Yun, C H Lim, T W Kim, H K Kim).

The scintillation detector known from U.S. Pat. No. 5,418,377, published May 23, 1995, IPC A61B 6/00, G21K4/00, H01J9/227 is selected as a closest analogue. The scintillation detector was formed by the phosphor layer filled in the hollows (gaps) on the substrate, the width of boundary between hollows not exceeding 5 microns. These hollows form the pixellated array of phosphor elements. The gaps are formed by lithography and aimed to decrease scattering between the phosphor elements.

The disadvantage of the mentioned scintillation detector is the low contrast of the image due to optical scattering in phosphor neighboring elements. Despite the fact that the upper part of optical phosphor layer is pixellated, the lower part is a continuous layer where diffused scattering occurs. Also, internal reflections may occur in the lower layer, what would lead to additional reduction of the contrast. Complexity of its technology represents an additional disadvantage of this structure: firstly, the need to align the groove grid relative to the matrix of photosensitive cells; secondly, the complexity of existing technologies used for establishing of pixellated elements within phosphor coatings.

DISCLOSURE OF THE INVENTION

The object of the invention is to create a new scintillation detector which assures high contrast of the image. The technical result achieved by the invention is in increase of the image contrast. To solve the designated problem and to achieve the claimed technical result we propose a new scintillation detector comprising at least one light detector (photosensor) with a matrix of cells; each of cell has a photosensitive zone and a scintillator. The proposed scintillator characterized from prototype in that the scintillator is formed as a structured 2D array of isolated elements deposited directly on the surface of the photosensor.

The location of scintillation elements is spatially matched with the matrix photosensor cells, so each of the scintillation elements is located on one of the photosensitive areas of the photosensor cell.

The shape of each scintillation element is calculated for optimal "x-ray→light" output transformation; the light is directed toward one of the photosensitive regions of the photosensor cell. Preferably, each of the scintillation elements is of hemispherical and/or parabolic and/or focon shape, the bottom edge of the scintillation element does not extend beyond the surface area of a photosensitive zone.

Additionally, the scintillator has separating shields between the scintillation elements, wherein said separator is made of a x-ray/gamma radiation absorbing material and reflects visible light. Optionally, the separator can be made of a material that transmits x-ray/gamma radiation and reflects visible light.

At least a part of the shields is made of a material which absorbs detected (x-ray or gamma) radiation and reflects a visible light; and at least a part of these shields is formed of a material that transmits the detected radiation and reflects visible light.

Scintillator surface, or preferably the surface of scintillation elements, is additionally coated with a reflective material. Scintillation detector also contains an adhesion layer between the scintillator and the photosensor.

Scintillation detector has at least one power supply source and/or at least one cooling unit and/or at least one control unit and digital communication interface and/or at least one unit of analog interface, or any conceivable combination of the said units.

The essential difference of the proposed scintillation detector is the new design concept presented in the form of a structured array of mutually isolated elements formed on the surface of the photosensitive area of photosensor cells. The localized and isolated arrangement of each scintillator element (relative to the other elements) provides their optical separation at the scintillator layer level, which avoids the noise light quantum illumination and scattering between neighboring cells of the photosensor cells, i.e. it eliminates scattering effect between bordering cells, thereby it allows to achieve the claimed technical result. The separation properties can be increased by wave-guiding features of the scintillator elements.

DETAILED DESCRIPTION OF THE PREFERRED EMBODIMENTS

Figure 1:
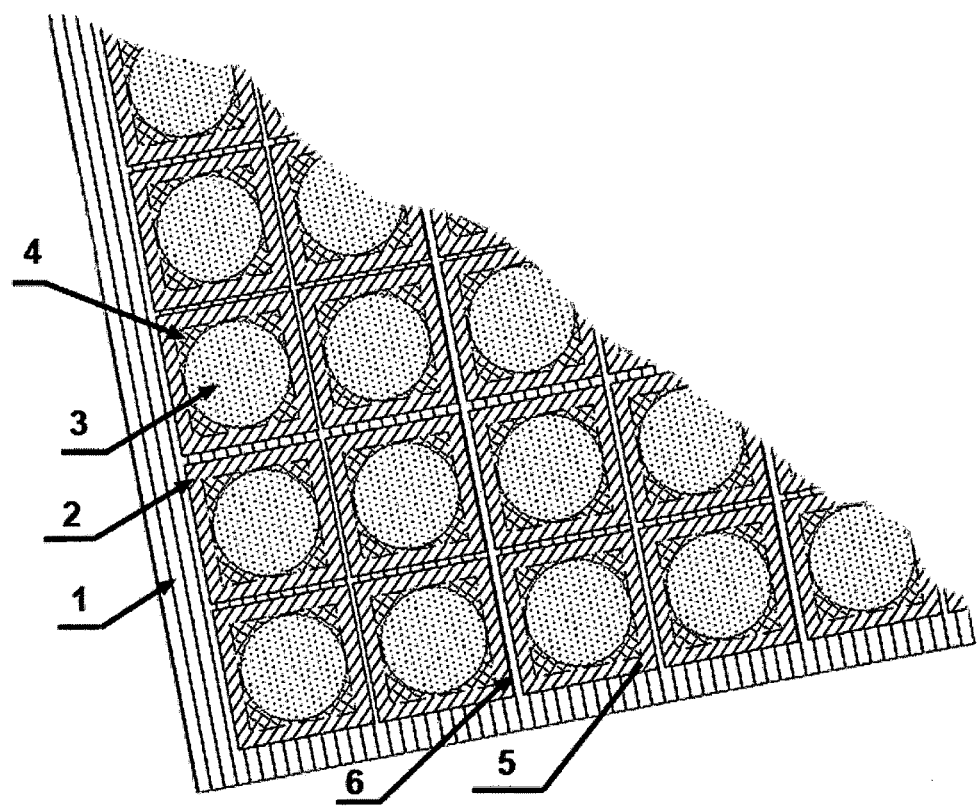
FIG. 1—plan view of a scintillation detector.

FIG. 1 shows a scintillation detector with at least one photosensor 1 with a matrix of cells 2 and an array of structured scintillators with mutually isolated elements 3. Each of the cells 2 has photosensitive zone 4 and a zone 5 of low sensitivity (or insensitive zone). The electrical contacts 6 are located between the cells and these contacts are sealed with transparent dielectric (not shown). Normally the sensitive area of zone 4 has a much more large area than the zone of low sensitivity 5.

Scintillator elements 3 formed on the surface of the photosensor 1 are made using at least one nano-composite based on a phosphor with corresponding range of the detected radiation, e.g., X-rays or gamma radiation. As a nano-composite, one can use any known nano-particle phosphors-based material with efficient registration of the target radiation.

Figure 2:
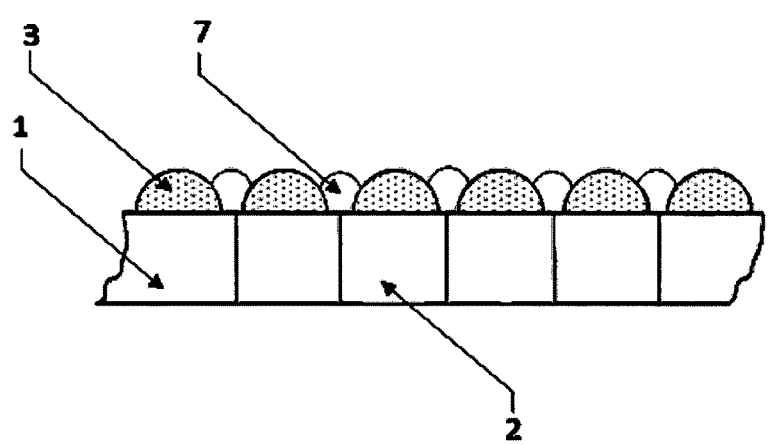
FIG. 2—schematical representation of a vertical section of the scintillation detector with x-ray- or gamma-absorbing separators which reflect visible light.

Location of the scintillation elements 3 spatially correlated with cell-matrix 2 of the photosensor 1, wherein each scintillator element 3 is located above one of the photosensitive regions 4 of the cell 2 of the photosensor 1 (FIG. 1, FIG. 2) that provides a physical isolation of the sensitive zones 4 of a scintillator. Indeed, the light produced by a separate scintillation element 3 will only reach the sensitive area 4 of its "own" cell 2, thus providing a contrast enhancement of the resulted image.

Preferably, each of the scintillator elements 3 has a shape calculated for optimal light output, e.g. hemispherical (FIG. 1-4), or paraboloid (not shown) or combinations of these various shapes (not shown). And the bottom edge of the scintillation elements 3 do not extend beyond the sensitive area 4 if possible (FIG. 1) to achieve the most complete and accurate detection, as well as to further sharpen the image. Since shape of a scintillation element affects the efficiency of the whole detector, it should be noted that the above mentioned shapes are preferred since the luminous efficiency of the scintillation detector is increased due to the fact that a large number of light photons reaching the photosensor surface.

Figure 3:
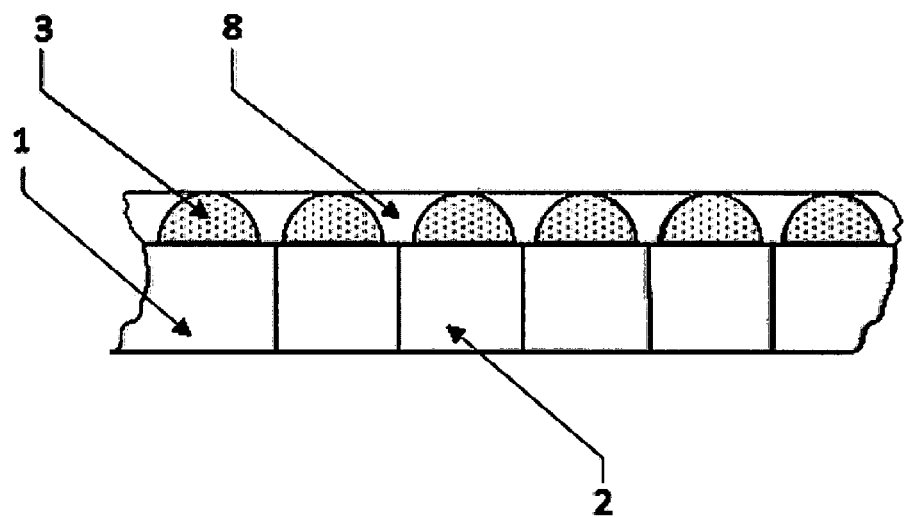
FIG. 3—vertical section of the scintillation detector with shields made of a material which transmits the detected radiation and reflects visible light.
Figure 4:
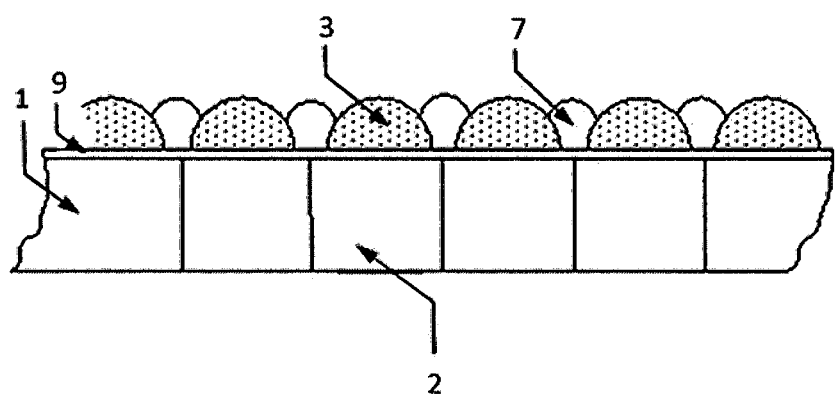
FIG. 4—vertical section of the scintillation detector with particles made of a material absorbing the detected radiation and reflecting visible light, and an adhesive layer.

We recommend to arrange the shields 7 (FIG. 2) between the scintillation elements 3. These shields 7 are made of X-Ray absorbing material which reflects visible light. Another option is to have these shields (particles) 8 made of X-Ray transmissive material which reflects visible light (FIG. 3).

The shields 7 additionally help to ensure that the light produced by the element 3 will reach only zone 4 of the "own" cell 2 and would not fall into the adjacent cells; thereby further increasing the image contrast. For example, during the registration of x-ray radiation and gamma radiation, the shields 7 will facilitate the absorption of the corresponding additional radiation at inter-cell intervals, thereby reducing the level of its scattering by the scintillator in general.

Partitions 8 provide mechanical protection of the scintillation elements 3 and, simultaneously, the light insulation.

It should be noted that the scintillator design may have any possible combination of the shields and partitions, i.e. at least part of the partitions can be made x-ray or gamma absorbing and reflecting visible light, and at least part of the partitions can be made of a transmissive material for detected radiation and reflecting visible light.

Scintillator surface or, preferably, surface of the scintillator elements 3 is additionally coated with a visible-light reflective material (not shown). This coating can increase the effectiveness of each of the scintillation elements 3 by reducing light-radiation losses from each scintillating particle as Lambertian source.

Preferably the scintillation detector comprises an adhesive layer 9 on the photosensor surface for better adhesion of the scintillation elements 3 as well as the partitions 7 (FIG. 4), 8 (not shown) to the surface of the photosensor 1 itself.

Proposed scintillation detector may be connected to the electronic processing and control circuits and placed in a housing (not shown). The electronic processing and control circuits of the scintillation detector may further comprise at least one power supply and/or at least one cooling unit and/or at least one control unit and digital interface and/or at least one unit of analog interface, or any conceivable combination of the above.

Usually, accurate alignment of the photosensor matrix within the scintillator cells structure represents a technically challenging task. Equipment required for such alignment tasks and its depreciation costs significantly increase the cost of a product built on structured scintillators. One of the main advantages of the new construction of the proposed scintillation detector is the completely eliminated need for precise alignment of the structured scintillator based on the elements 3 with a matrix of cells 2 of a photosensor 1. Precise arrangement of the scintillation elements 3 and the matrix of cells 2 of a photosensor 1 is performed directly during the formation of the scintillation elements 3.

Proposed scintillation detector can be used in mammography (the medical systems designed for X-ray studies of female breast) and conventional X-ray systems. Employment of the proposed detector can achieve contrast enhancement of the image and the best diagnostic image quality. Preferred application of this detector is in mammography where the better resolution is crucial. Adjacent application areas for this detector are radiography and fluoroscopy.

Thus, the invention proposes a new type of scintillation detector whose main feature is the high contrast of the image achieved due to structuring the scintillator deposited on the surface of a matrix photosensor. The proposed detector has high image contrast due to eliminated dispersion between adjacent cells in the photosensor matrix. This result is achieved by physical segregation of neighboring sensitive areas at the scintillator so that the light produced by a scintillator element can only reach the designated cell and cannot occasionally get into any different (next) cell.

The invention claimed is:

1. A scintillation detector comprising; at least one photosensor with an array of cells, wherein each cell has a photosensitive region, and a scintillator, wherein the scintillator comprises a structured array of isolated scintillator elements deposited on a surface of the photosensor, wherein each photosensitive region of the photosensor extends beyond a scintillator element of the scintillator.

2. The scintillation detector according to claim 1, wherein the spatial arrangement of scintillator elements is in accord with the photosensor matrix.

3. The scintillation detector according to claim 2, wherein each of the scintillator elements is disposed on one of the photosensitive regions of the photosensor cell.

4. The scintillation detector according to claim 1, wherein each of the scintillator elements has a 3D shape configured to direct light toward a photosensitive region.

5. The scintillation detector according to claim 1, wherein each of the scintillator elements has wave-guiding (focon) properties calculated for optimal light output, the base of thereof is facing one of the photosensitive regions of the photosensor cell.

6. The scintillation detector according to claim 4, wherein each of the scintillator elements has semi-spherical or parabolic shape.

7. The scintillation detector according to claim 1, wherein the scintillator is additionally equipped with at least one shield between the scintillator elements.

8. The scintillation detector according to claim 7, wherein the at least one shield is made of material configured to absorb more x-ray/gamma radiation than is reflected and reflect more visible light than is absorbed.

9. The scintillation detector according to claim 7, wherein the at least one shield is made of material configured to transmit more detected radiation than is reflected and reflect more visible light than is transmitted.

10. The scintillation detector according to claim 7, wherein at least a part of the at least one shield is formed of a material that is configured to absorb more detected radiation than is reflected and reflect more visible light than is absorbed and at least a part of the at least one shield is made of a material that is configured to transmit more detected (x-ray or gamma) radiation than is reflected and reflect more visible light than is transmitted.

11. The scintillation detector according to claim 1, wherein a surface of the scintillator is coated with reflective material.

12. The scintillation detector according to claim 1, wherein an adhesion layer is disposed between the scintillator and the photosensor.

13. The scintillation detector according to claim 1, wherein the detector additionally comprises at least one power supply, at least one cooling unit, at least one control unit and digital communication interface, and at least one unit of analog interface.

14. The scintillation detector according to claim 1, wherein the surface correspond to surfaces of the scintillator elements.

* * * * *